April 7, 1925.
F. G. PENNY
CRUCIBLE FURNACE
Filed July 29, 1922
1,532,154
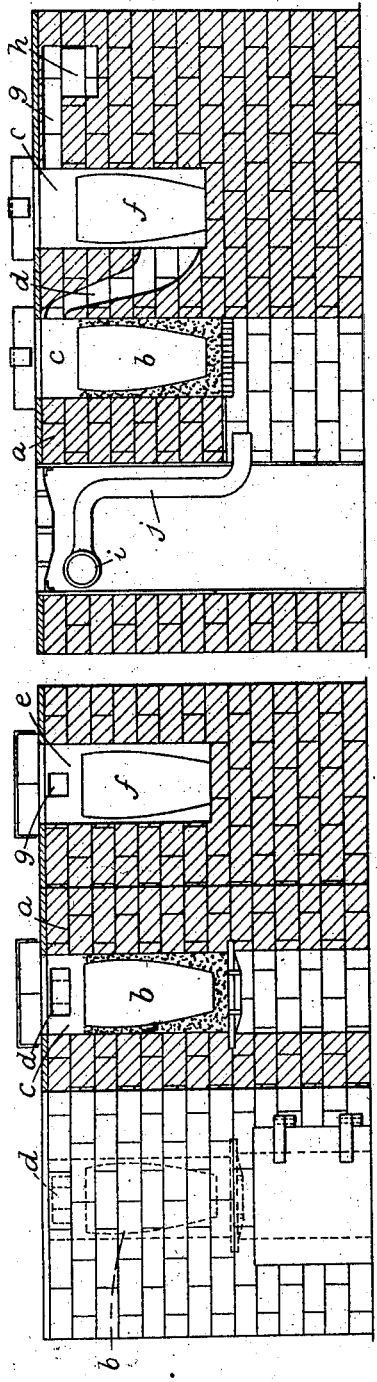
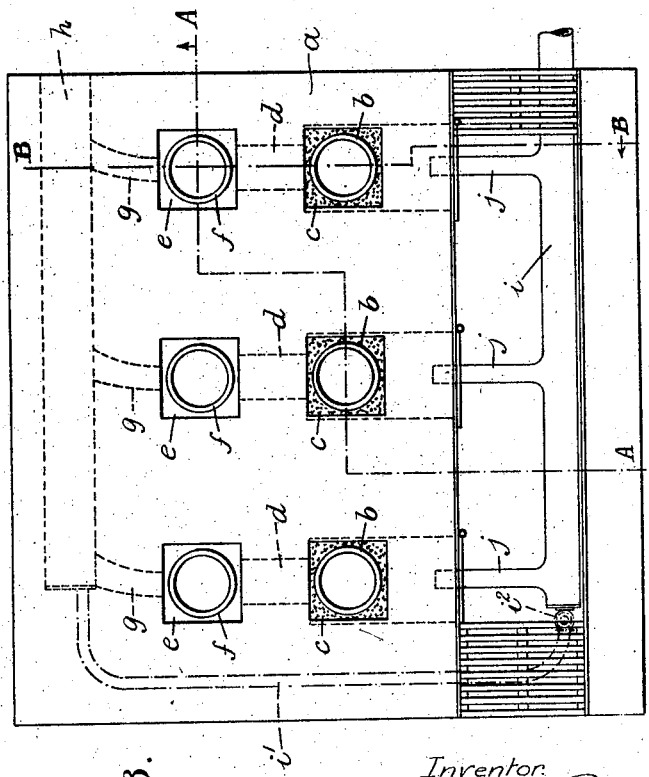
Inventor.
Frederick George Penny Patented Apr. 7, 1925.

1,532,154

UNITED STATES PATENT OFFICE.

FREDERICK GEORGE PENNY, OF LONDON, ENGLAND.

CRUCIBLE FURNACE.

Application filed July 29, 1922. Serial No. 578,505.

*To all whom it may concern:*

Be it known that I, FREDERICK GEORGE PENNY, a subject of the King of Great Britain, residing at 8, Blendon Terrace, Plumstead, London, S. E. 18, England, have invented new and useful Improvements in Connection with Crucible Furnaces, of which the following is a specification.

This invention relates to crucible furnaces, and has for its object to provide such a furnace of cheap cost, capable of not only melting non-ferrous metals, but, if required, nickel and iron with economy in both fuel and labour.

The invention has more particular reference to that type of furnace wherein an auxiliary crucible heating chamber or chambers is or are connected to each main furnace and heated therefrom, whereby economy in fuel and labour and an increased output are obtained; in connection with such known type of furnace it has been proposed to employ a main furnace with blast, the auxiliary crucible heating chamber being in communication by means of a channel or flue leading from the upper part of the main furnace to the lower part of the auxiliary heating chamber, together with passages leading from the auxiliary chamber or chambers to the main flue.

According to the present invention, by a combination of detail improvements to be defined, I am enabled to more efficiently operate such a furnace, and in fact can readily melt the contents of the crucibles in the auxiliary chambers without recourse to transferring to the main furnace for final heating. The invention consists essentially in the employment of communicating channels with respectively narrow inlets leading from the top of the main furnace and which gradually diverge and curve into wide mouths at the bottom of the auxiliary chambers, in combination with subsidiary flues from the latter chambers to the main flue which also splay open to a wider outlet mouth whilst they curve towards the main flue outlet end. In conjunction therewith I employ a small by-pass branch from the blast pipe to the interior end of the main flue to cause a gentle induction in the aforesaid specially shaped subsidiary flues.

A furnace of this kind may be constructed in bricked-in pits, or in iron or steel cases, or may be portable and adapted to be dropped into pits, in battery form if necessary when it is easily coupled up. Said furnace may be lined with a suitable refractory material in lieu of bricks so as to dispose of the necessity of jointing up the four faces of the furnace as when bricked up, which joints are easily disturbed when clinkering.

An embodiment of said invention is illustrated in the accompanying drawings, in which:—

Figure 1 is a part sectional front elevation, the sectional parts being on line A—A of Figure 3, of a crucible furnace in battery form constructed in accordance with this invention, and wherein two pots or crucibles are heated from one firing source;

Figure 2 is a sectional end elevation on line B—B of Figure 3; and

Figure 3 a plan of same, also partly in section.

In the drawings aforesaid, the reference letter $a$ indicates the brickwall of the furnace, and $b$ are crucibles in chambers or fire-boxes $c$ which are directly fired by a suitable fuel, such as coke, which is packed around and under the crucibles. Each of these fire-boxes $c$ is in communication by means of the inclined and gradually enlarging channels $d$ with an auxiliary heating chamber $e$ containing crucible $f$. Said channels $d$ are preferably arranged, as seen more particularly in Figure 2, each with its upper and smaller end in connection with the upper end of the firing chamber $c$, and its lower and larger end in connection with the lower part of the auxiliary chamber $e$.

Passages $g$ leading from the upper part of the chambers $e$ to the main flue $h$ serve to convey waste gases and products of combustion from the furnace to an uptake or chimney or through an absorber. These passages $g$ also splay outwardly, and are curved towards the outlet end of the main flue $h$.

A blast pipe $i$ is provided which is fitted with branches $j$ which conduct the blast to the furnaces $c$, and also a branch $i^1$ (shown in dot-and-dash lines) which is led off—controllable by valve $i^2$—to the main flue $h$ to cause a gentle induction in the flues $g$ and keep the flue fairly clear, as it is not necessary to erect the ordinary chimney stack.

What I claim is:—

In crucible furnaces of the type herein specified, the employment of communicating channels with respectively narrow inlets leading from the top of the main furnace and which gradually diverge and curve into wide mouths at the bottom of the auxiliary chambers, in combination with subsidiary flues from the latter chambers to the main flue which also splay open to a wider outlet mouth whilst they curve towards the main flue outlet end, together with a small by-pass branch from the last pipe to the interior end of the main flue to cause a gentle induction in the aforesaid specially shaped subsidiary flues, substantially as herein described.

FREDERICK GEORGE PENNY.